US012481177B1

(12) United States Patent
Etem

(10) Patent No.: US 12,481,177 B1
(45) Date of Patent: Nov. 25, 2025

(54) VAPOR SUNGLASSES

(71) Applicant: Emerson Albert Etem, Long Beach, CA (US)

(72) Inventor: Emerson Albert Etem, Long Beach, CA (US)

( * ) Notice: Subject to any disclaimer, the term of this patent is extended or adjusted under 35 U.S.C. 154(b) by 390 days.

(21) Appl. No.: 18/132,893

(22) Filed: Apr. 10, 2023

(51) Int. Cl.

| | |
|---|---|
| ***A24F 40/30*** | (2020.01) |
| ***A24F 7/00*** | (2006.01) |
| ***A24F 40/42*** | (2020.01) |
| ***A24F 40/90*** | (2020.01) |
| ***A24F 47/00*** | (2020.01) |
| ***G02C 5/02*** | (2006.01) |
| ***G02C 5/14*** | (2006.01) |
| ***G02C 11/00*** | (2006.01) |

(52) U.S. Cl.
CPC ................ *G02C 11/10* (2013.01); *A24F 7/00* (2013.01); *A24F 40/30* (2020.01); *A24F 40/42* (2020.01); *A24F 40/90* (2020.01); *A24F 47/00* (2013.01); *G02C 5/02* (2013.01); *G02C 5/14* (2013.01)

(58) Field of Classification Search
None
See application file for complete search history.

(56) References Cited

U.S. PATENT DOCUMENTS

| | | | | |
|---|---|---|---|---|
| 4,955,708 | A | 9/1990 | Kahaney | |
| D917,606 | S | 4/2021 | Boinnard et al. | |
| 11,019,844 | B1 * | 6/2021 | Gordan | G02C 11/00 |
| D956,857 | S | 7/2022 | Jamin | |
| D972,002 | S | 12/2022 | Jiyu | |
| D1,040,892 | S | 9/2024 | DiLorenzo et al. | |

* cited by examiner

*Primary Examiner* — Michael H. Wilson
*Assistant Examiner* — Michael T Fulton
(74) *Attorney, Agent, or Firm* — Plager Schack LLP; Mark H. Plager; Michael J. O'Brien

(57) ABSTRACT

Vapor sunglasses are configured to dispense vapor to a user; the vapor sunglasses have a first frame joined to a second frame. The first frame has a first lens and the second frame has a second lens. A first heat switch is arranged on the first frame. A first hollow mouthpiece is joined to the first frame with a first hinge. A first temple tip is joined to the first frame with a first temple tip hinge. A first cartridge tank is arranged inside the first frame. A first atomizer is connected to the first cartridge tank and a first battery. A first charge port is connected to the first battery. Engaging the first heat switch causes the atomizer to atomize material in the first cartridge tank into a vapor that is discharged through the first hollow mouthpiece.

6 Claims, 3 Drawing Sheets

18
22
20
22
14
16
24
36
20
16

VAPOR SUNGLASSES

BACKGROUND

The embodiments herein relate generally to fashion accessories.

Prior to embodiments of the disclosed invention, there was no way to obtain vapor from sunglasses. Embodiments of the disclosed invention solve this problem.

SUMMARY

Vapor sunglasses are configured to dispense vapor to a user. The vapor sunglasses have a first frame joined to a second frame. The first frame has a first lens and the second frame has a second lens. A first heat switch is arranged on the first frame. A first hollow mouthpiece is joined to the first frame with a first hinge. A first temple tip is joined to the first frame with a first temple tip hinge. A first cartridge tank is arranged inside the first frame. A first atomizer is connected to the first cartridge tank and a first battery. A first charge port is connected to the first battery. Engaging the first heat switch causes the atomizer to atomize material in the first cartridge tank into a vapor that is discharged through the first hollow mouthpiece.

In some embodiments, a connection piece detachably couples the first frame to the second frame. A second heat switch is arranged on the second frame. A second hollow mouthpiece, joined to the second frame with a second hinge. A second temple tip is joined to the second frame with a second temple tip hinge. A second cartridge tank, arranged inside the second frame. A second atomizer is connected to the second cartridge tank and a second battery. A second charge port is connected to the second battery. Engaging the second heat switch causes the atomizer to atomize material in the second cartridge tank into a vapor that is discharged through the second hollow mouthpiece.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
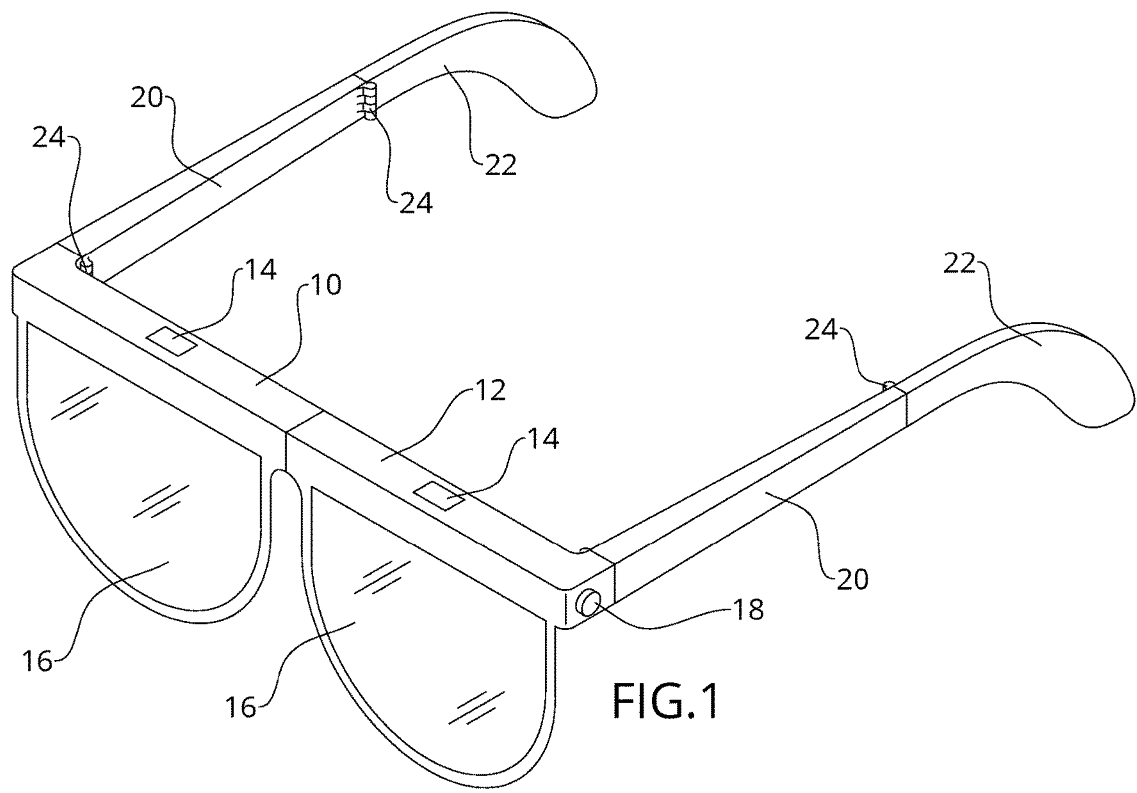
FIG. 1 shows a perspective view of one embodiment of the present invention.
Figure 2:
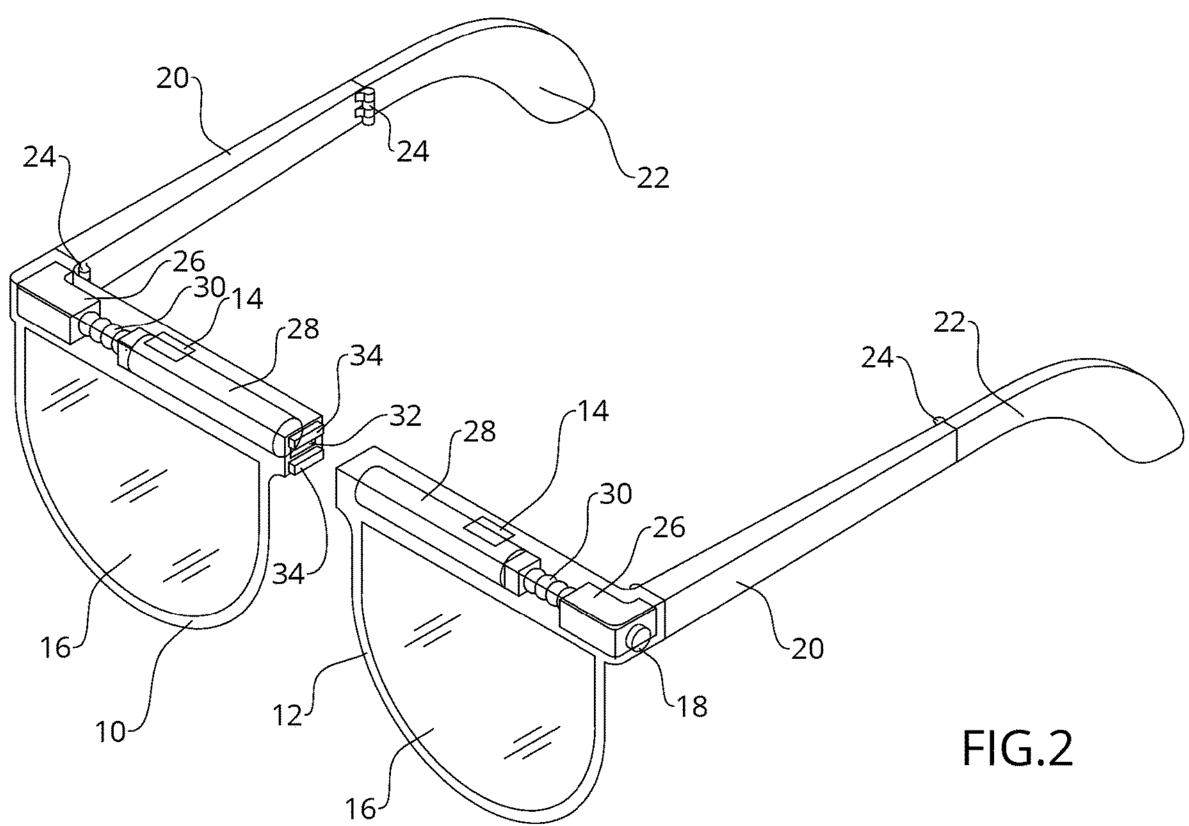
FIG. 2 shows an exploded schematic view of one embodiment of the present invention.
Figure 3:
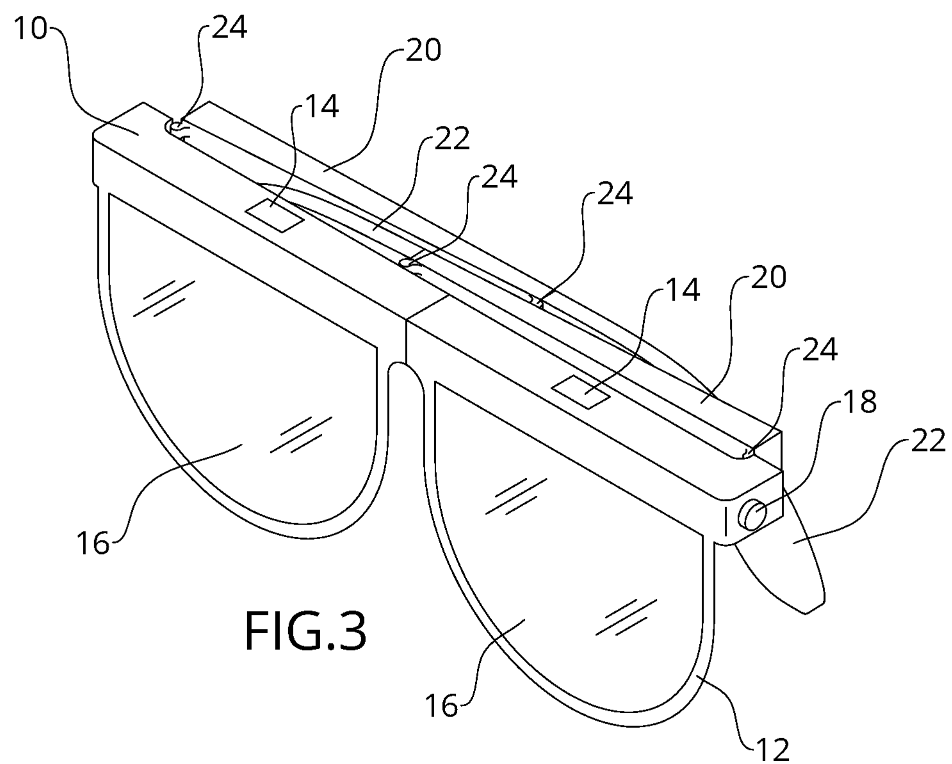
FIG. 3 shows a perspective view of one embodiment of the present invention.
Figure 4:
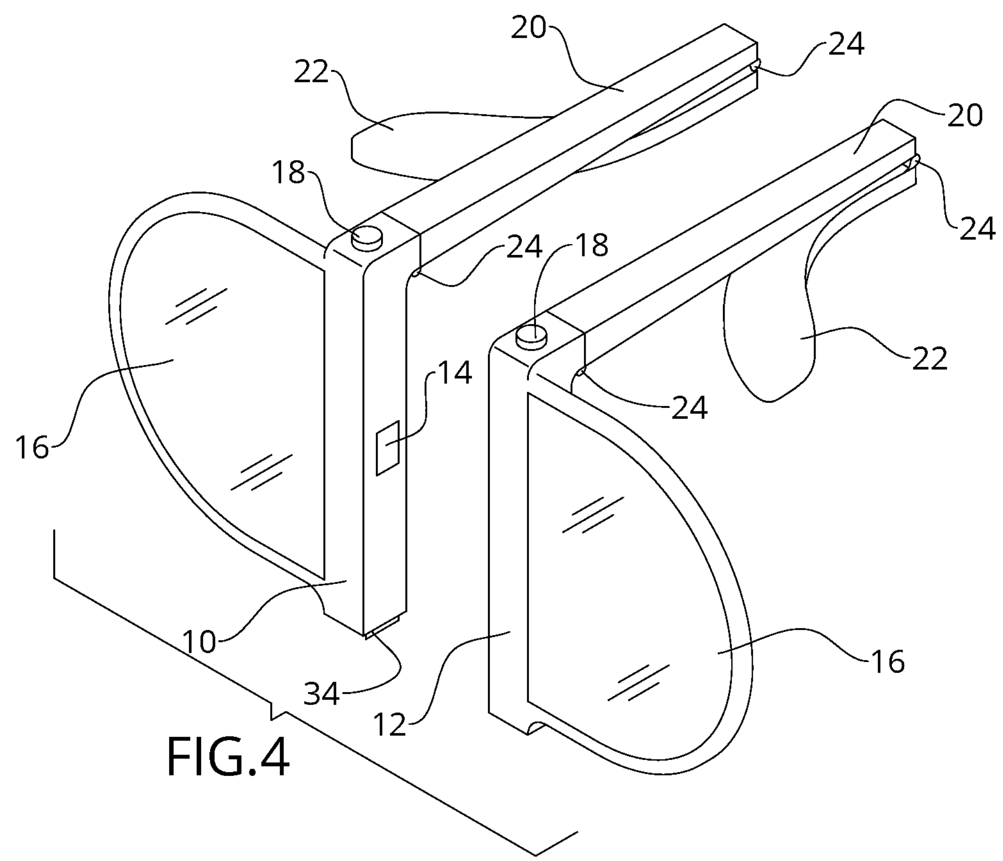
FIG. 4 shows a perspective view of one embodiment of the present invention.
Figure 5:
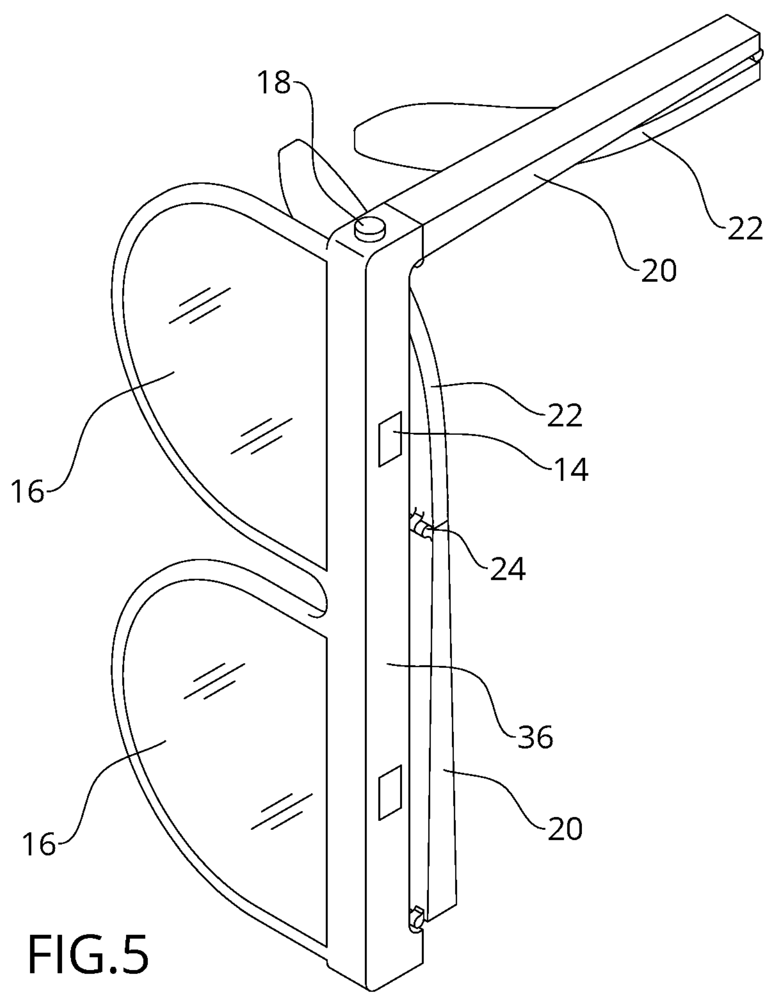
FIG. 5 shows a perspective view of one embodiment of the present invention.

By way of example, and referring to FIGS. 1-5, one embodiment of vapor sunglasses are configured to dispense vapor to a user. The vapor sunglasses have a first frame 10 joined to a second frame 12. The first frame 10 has a first lens 16 and the second frame 12 has a second lens 16. A first heat switch 14 is arranged on the first frame 10. A first hollow mouthpiece 20 is joined to the first frame 10 with a first hinge 24. A first temple tip 22 is joined to the first frame 10 with a first temple tip hinge 24. A first cartridge tank 26 is arranged inside the first frame 10 and can be filled from a first cartridge cap 18. A first atomizer 30 is connected to the first cartridge tank 26 and a first battery 28. A first charge port 32 is connected to the first battery 28. Engaging the first heat switch 14 causes the atomizer 30 to atomize material in the first cartridge tank 26 into a vapor that is discharged through the first hollow mouthpiece 20.

In some embodiments, a connection piece 34 detachably couples the first frame 10 to the second frame 12. A second heat switch 14 arranged on the second frame 12. A second hollow mouthpiece 20 is joined to the second frame 12 with a second hinge 24. A second temple tip 22 is joined to the second frame 12 with a second temple tip hinge 24. A second cartridge tank 26 is arranged inside the second frame 12. A second atomizer 30 is connected to the second cartridge tank 26 and a second battery 28. A second charge port 32 is connected to the second battery 28. Engaging the second heat switch 14 causes the second atomizer 30 to atomize material in the second cartridge tank 26 into a vapor that is discharged through the second hollow mouthpiece 20.

As used in this application, the term “a” or “an” means “at least one” or “one or more.”

As used in this application, the term “about” or “approximately” refers to a range of values within plus or minus 10% of the specified number.

As used in this application, the term “substantially” means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state “means for” performing a specified function, or “step for” performing a specified function, is not to be interpreted as a “means” or “step” clause as specified in 35 U.S.C. § 112, ¶16. In particular, any use of “step of” in the claims is not intended to invoke the provision of 35 U.S.C. § 112, ¶16.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. Vapor sunglasses, configured to dispense vapor to a user; the vapor sunglasses comprising:

a first frame, joined to a second frame; wherein the first frame has a first lens and the second frame has a second lens;

a first heat switch arranged on the first frame;

a first hollow mouthpiece, joined to the first frame with a first hinge;

a first temple tip, joined to the first frame with a first temple tip hinge;

a first cartridge tank, arranged inside the first frame;

a first atomizer, connected to the first cartridge tank and a first battery;

a first charge port, connected to the first battery;

wherein engaging the first heat switch causes the atomizer to atomize material in the first cartridge tank into a vapor that is discharged through the first hollow mouthpiece.

2. The vapor sunglasses of claim 1, further comprising a connection piece, detachably coupling the first frame to the second frame.

3. The vapor sunglasses of claim 2, further comprising a second heat switch arranged on the second frame.

4. The vapor sunglasses of claim 3, further comprising a second hollow mouthpiece, joined to the second frame with a second hinge.

5. The vapor sunglasses of claim 4, further comprising a second temple tip, joined to the second frame with a second temple tip hinge.

6. The vapor sunglasses of claim 5, further comprising a second cartridge tank, arranged inside the second frame.

* * * * *